United States Patent
Fleischman et al.

(10) Patent No.: US 11,200,378 B2
(45) Date of Patent: Dec. 14, 2021

(54) METHODS AND SYSTEMS FOR PROCESSING LANGUAGE WITH STANDARDIZATION OF SOURCE DATA

(71) Applicant: INTERNATIONAL BUSINESS MACHINES CORPORATION, Armonk, NY (US)

(72) Inventors: Thomas J. Fleischman, Poughkeepsie, NY (US); Emily R. Kinser, Poughkeepsie, NY (US); John E. Drummond, Pleasant Valley, NY (US); Wayne M. Delia, Poughkeepsie, NY (US); Sue Hallen, Elk Grove Village, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 254 days.

(21) Appl. No.: 16/157,573

(22) Filed: Oct. 11, 2018

(65) Prior Publication Data

US 2020/0117711 A1   Apr. 16, 2020

(51) Int. Cl.
*G06F 40/30* (2020.01)
*G06F 40/247* (2020.01)

(52) U.S. Cl.
CPC .......... *G06F 40/30* (2020.01); *G06F 40/247* (2020.01)

(58) Field of Classification Search
None
See application file for complete search history.

(56) References Cited

U.S. PATENT DOCUMENTS

| | | | |
|---|---|---|---|
| 6,189,002 B1 | 2/2001 | Roitblat | |
| 7,113,943 B2 | 9/2006 | Bradford et al. | |
| 7,792,832 B2 | 9/2010 | Poltorak | |
| 8,079,023 B2* | 12/2011 | Chen | G06F 8/437 717/140 |
| 8,185,373 B1* | 5/2012 | Messenger | G06F 40/51 704/2 |
| 8,776,017 B2* | 7/2014 | Perlmutter | G06F 21/6218 717/115 |
| 9,063,931 B2* | 6/2015 | Wu | G06F 40/42 |
| 9,946,710 B2* | 4/2018 | Yamaguchi | G06F 40/55 |
| 10,073,821 B2* | 9/2018 | La Fontaine | G06F 40/143 |
| 2003/0061022 A1* | 3/2003 | Reinders | G06F 40/58 704/2 |

(Continued)

OTHER PUBLICATIONS

Abbas et al., "A literature review on the state-of-the-art in patent analysis," World Patent Information 37, 2014 (11 pages).

Cascini et al., "Measuring patent similarity by comparing inventions functional trees," Computer-Aided Innovation (CAI), IFIP International Federation for Information Processing, vol. 277, 2008 (12 pages).

(Continued)

*Primary Examiner* — Neeraj Sharma
(74) *Attorney, Agent, or Firm* — Griffiths & Seaton PLLC (57) ABSTRACT

Embodiments for processing language by one or more processors are described. A plurality of document portions are detected. Each of the plurality of document portions includes text in a respective language type. The text of each of the plurality of document portions is converted to a standardized language type. A language processing method is caused to be performed on the plurality of document portions after the converting of the text of each of the plurality of document portions to the standardized language type.

18 Claims, 5 Drawing Sheets

(56) References Cited

U.S. PATENT DOCUMENTS

| | | | | |
|---|---|---|---|---|
| 2004/0243986 | A1* | 12/2004 | Nishiyama | G06F 9/45508 |
| | | | | 717/139 |
| 2005/0165600 | A1 | 7/2005 | Kasravi et al. | |
| 2007/0055523 | A1* | 3/2007 | Yang | G09B 19/06 |
| | | | | 704/257 |
| 2007/0112554 | A1* | 5/2007 | Goradia | G06F 40/242 |
| | | | | 704/4 |
| 2012/0221321 | A1* | 8/2012 | Nakamura | G10L 15/32 |
| | | | | 704/2 |
| 2014/0295384 | A1* | 10/2014 | Nielson | A61B 5/165 |
| | | | | 434/157 |
| 2017/0192758 | A1* | 7/2017 | Apte | G06F 8/51 |
| 2017/0270627 | A1* | 9/2017 | Hodge | G06F 40/242 |
| 2018/0293228 | A1* | 10/2018 | Tarakji | G06F 40/284 |
| 2019/0073997 | A1* | 3/2019 | Millen | G06N 20/20 |
| 2020/0089763 | A1* | 3/2020 | Malik | G06N 20/00 |

OTHER PUBLICATIONS

Korobkin et al., "Prior Art Candidate Search on Base of Statistical and Semantic Patent Analysis," International Conferences Computer Graphics, Visualization, Computer Vision and Image Processing and Big Data Analytics, Data Mining and Computational Intelligence, Jul. 21-23, 2017 (8 pages).

Park et al., "Identifying Patent Infringement using SAO-based Semantic Technological Similarity," Department of Technology and Innovation Management, POSTECH,https://www.semanticscholar.org/paper/Identifying-patent-infringement-using-SAO-based-Park-Yoon/23942bc2506a07a1683f5f26d0f2a1d29468d201, Nov. 5, 2011 (11 pages).

Yang et al., "SAO-Based Core Technological Components' Identification," 2016 10th International Conference on Software, Knowledge, Information Management & Applications (SKIMA), 2016 (6 pages).

* cited by examiner

METHODS AND SYSTEMS FOR PROCESSING LANGUAGE WITH STANDARDIZATION OF SOURCE DATA

BACKGROUND OF THE INVENTION

Field of the Invention

The present invention relates in general to computing systems, and more particularly, to various embodiments for processing language with a standardization of source data.

Description of the Related Art

Current language processing tools and methods, such as those utilizing cognitive analysis and/or natural language processing (NLP), have had limited success when analyzing or comparing multiple documents or multiple document sections (e.g., comparing a section of one document to a section of another document). One reason for this may be that current systems typically utilize a single synonym table (or "dictionary") or model to analyze and/or compare multiple documents.

In particular, different documents (or portions of documents) may be written in different "language types." That is, not only may the different documents be written in different natural languages (e.g., English, Spanish, French, etc.) but the documents may, for various reasons, use different terminology for describing the same thing.

SUMMARY OF THE INVENTION

Various embodiments for processing language by one or more processors are described. In one embodiment, by way of example only, a method for processing patents, again by one or more processors, is provided. A plurality of document portions are detected. Each of the plurality of document portions includes text in a respective language type. The text of each of the plurality of document portions is converted to a standardized language type. A language processing method is caused to be performed on the plurality of document portions after the converting of the text of each of the plurality of document portions to the standardized language type.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

As discussed above, current language processing tools and methods, such as those utilizing cognitive analysis and/or natural language processing (NLP), have had limited success when analyzing or comparing multiple documents or multiple document sections (e.g., comparing a section of one document to a section of another document). One reason for this may be that current systems typically utilize a single synonym table (or "dictionary") or model to analyze and/or compare multiple documents.

In particular, different documents (or portions of documents) may be written in different "language types." That is, not only may the different documents be written in different natural languages (e.g., English, Spanish, French, etc.) but the documents may, for various reasons, use different terminology for describing what is essentially the same thing.

As one example, consider the use of conventional NLP to analyze patents (and/or patent applications) to identify potential infringement. Generally, it may be the case that one has to read and properly understand such a legal document, interpret the claims, and then attempt to find matching, or at least similar, documentation (e.g., describing potentially infringing products, methods, etc.). When utilized for infringement analysis, conventional NLP techniques may be considered to be performed in such a manner that it is assumed that the patents and the related documents are similar (e.g., written with the same language type) to begin with.

However, when the documents are examined closely, although they may all be written in the same natural language (e.g., English), the documents, or at least portions thereof, may be written in very different manners (e.g., language types). For example, the claims in a patent may include legal language and phrases, and the definitions of the claim elements are often in the body (e.g., the description) of the patent. Additionally, the description may be written in a relatively "engineering" and/or "technology specific" type language compared to the abstract, which may include a "common" type language (e.g., "conversational" or "common" English). That is, the description may include a relatively detailed description of the problem and solution, while using terminology that is more standard for the technology at hand and typically less legal in nature.

Additionally, documentation that may be used to identify potential patent infringement may include web pages and user documentation. The "grade level" or "knowledge base" of those documents may vary depending on the intended user or audience. If a user manual is associated with a simple consumer product, it may be written in a relatively simple, easy-to-read manner compared to, for example, a repair manual or detailed product specification for the same product. The same may be true for more advanced and/or complicated products. For example, a user manual for a mobile phone may be written using a more common language type compared to that of a lithography tool user manual.

Additionally, terminology and definitions may change over time. That is, a document related to early semiconductor processing development, which was written in the 1960s, may use different terminology than a recently written document about semiconductor processing, although in some regards, the technology may be similar. Further, different subjects, areas of expertise, technologies, etc. may have different definitions for the same term. For example, the term "networking" is sometimes used to describe the physical components and hardware related to modern communications (e.g., the Internet, the web, etc.). However, the same term may have a different meaning when referring to software (e.g., social networking, etc.).

To address these needs, some embodiments described herein provide methods and systems for processing language that convert the language used in different documents (or portions of documents) to a "standardized" or "common" (i.e., the same) language type before attempting a language processing method (e.g., identifying keywords, key phrases, synonym expansion, etc.). The language processing method may then be used to, for example, identify relevant documents (e.g., potentially matching documents).

In some embodiments, the methods and systems described herein detect (or receive or retrieve) multiple document portions (e.g., multiple documents, multiple portions of documents, etc.). The detection of the different document portions may include identifying where the documentation uses different language types or constructs and/or determining the language types of each of the document portions, which may be performed with, for example, a cognitive analysis. As used herein, "language type" may be understood to refer to, for example, a "knowledge base level," "skill level," "ease of understanding," etc. associated with the language, perhaps combined with the natural language (e.g., English, French, Spanish, etc.) thereof.

After the language type for each of the document portions is determined, a word list (and/or dictionary and/or synonym table) may be generated (or selected) for each of the document portions (and/or the corresponding language type). The word list(s) may be based on and/or include different aspects (or "slices") suitable to convert the document portions into a common or standardized language type based on the various language types. For example, in some documents (or document portions), such as claims of a patent (or patent application) the word list may be based on definitions found in the body (or description) of the patent. As another example, the word list may be generated in light of the age of the document (i.e., as the definition and/or use of words may change over time). Additionally, the word list may take into consideration the type (or context) of the document (e.g., patent, user manual, repair manual, etc.), as different types of documents may use different "grades" (or knowledge base level) of language. Further, the word list may be selected (or generated) based on a type of technology related to (e.g., described in) the document (e.g., semiconductor processing, software, automotive, aerospace, etc.).

In some embodiments, the word lists are then used to convert the document portions such that the language types thereof are the same (e.g., a common or standardized language type), perhaps as well as convert (or translate) the document portions into the same natural language (e.g., English, Spanish, etc.) if so required or desired. For example, the text of the documents may be converted into a relatively simple, easy-to-read language type (e.g., "grade school English"). However, it should be understood that the standardized language type may be more "advanced" in some embodiments (e.g., a college level, technical English). Further, it should be understood that at least some of the document portions may already be written in the selected standardized language type. For example, one of the document portions, such as a user manual, may already be written in a simple language type, while the other document portions, such as those from a patent and/or repair manual, may be written in a more advanced language type. In such an instance, the user manual may not undergo the conversion into the standardized language type (i.e., because that document portion is already in the standardized language type).

With all of the document portions (i.e., those being analyzed) in the standardized language type, in some embodiments, a language processing method is then performed on the document portions. The language processing method may include a NLP method (e.g., using a synonym table for the standardized language) and/or be performed utilizing a cognitive analysis. In some embodiments, the language processing method includes analyzing the document portions for similarities, commonalities, etc. (e.g., in the case of patent infringement, links for possible infringement).

As such, in some embodiments, the methods and/or systems described herein may utilize a "cognitive analysis," a "cognitive neural network," "machine learning," "cognitive modeling," "predictive analytics," and/or "data analytics," as is commonly understood by one skilled in the art. Generally, these processes may include, for example, receiving and/or retrieving multiple sets of inputs, and the associated outputs, of one or more systems and processing the data (e.g., using a computing system and/or processor) to generate or extract models, rules, etc. that correspond to, govern, and/or estimate the operation of the system(s). Utilizing the models, the performance (or operation) of the system (e.g., utilizing/based on new inputs) may be predicted and/or the performance of the system may be optimized by investigating how changes in the input(s) affect the output(s).

With respect to the embodiments described herein, the cognitive analysis (and/or a language processing method) may include classifying natural language, analyzing tone, and analyzing sentiment (e.g., scanning for keywords, key phrases, etc.) with respect to, for example, the keywords, key phrases, etc. found in documents or portions of documents. Over time, the methods and systems described herein may determine correlations (or insights) that allow for an improvement in the conversion of multiple document portions into a standardized language type and/or the analysis of the document types, perhaps with feedback provided by users, that allows for the performance of the system to improve with continued use.

In particular, in some embodiments, a method, by one or more processors, for processing language is provided. A plurality of document portions are detected. Each of the plurality of document portions includes text in a respective language type. The text of each of the plurality of document portions is converted to a standardized language type. A language processing method is caused to be performed on the plurality of document portions after the converting of the text of each of the plurality of document portions to the standardized language type.

The language type of the text in each of the plurality of document portions may be different than the language type of the text in the others of the plurality of document portions. A word list may be selected for each of the plurality of document portions. The converting of the text of each of the plurality of document portions to the standardized language type may be based on the respective word list.

The selecting of the word list for at least some of the plurality of document portions may be based on at least one of a context (or type) of the respective document portion and an age of the respective document portion. The selecting of the word list for at least some of the plurality of document portions may be based on at least one of a natural language of the respective language type and a knowledge base associated with the respective document portion. The selecting of the word list for at least some of the plurality of document portions may be based on definitions within the respective documents.

The language processing method may be performed utilizing a synonym table. The language processing method may include natural language processing (NLP) and/or a cognitive analysis.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment, such as cellular networks, now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
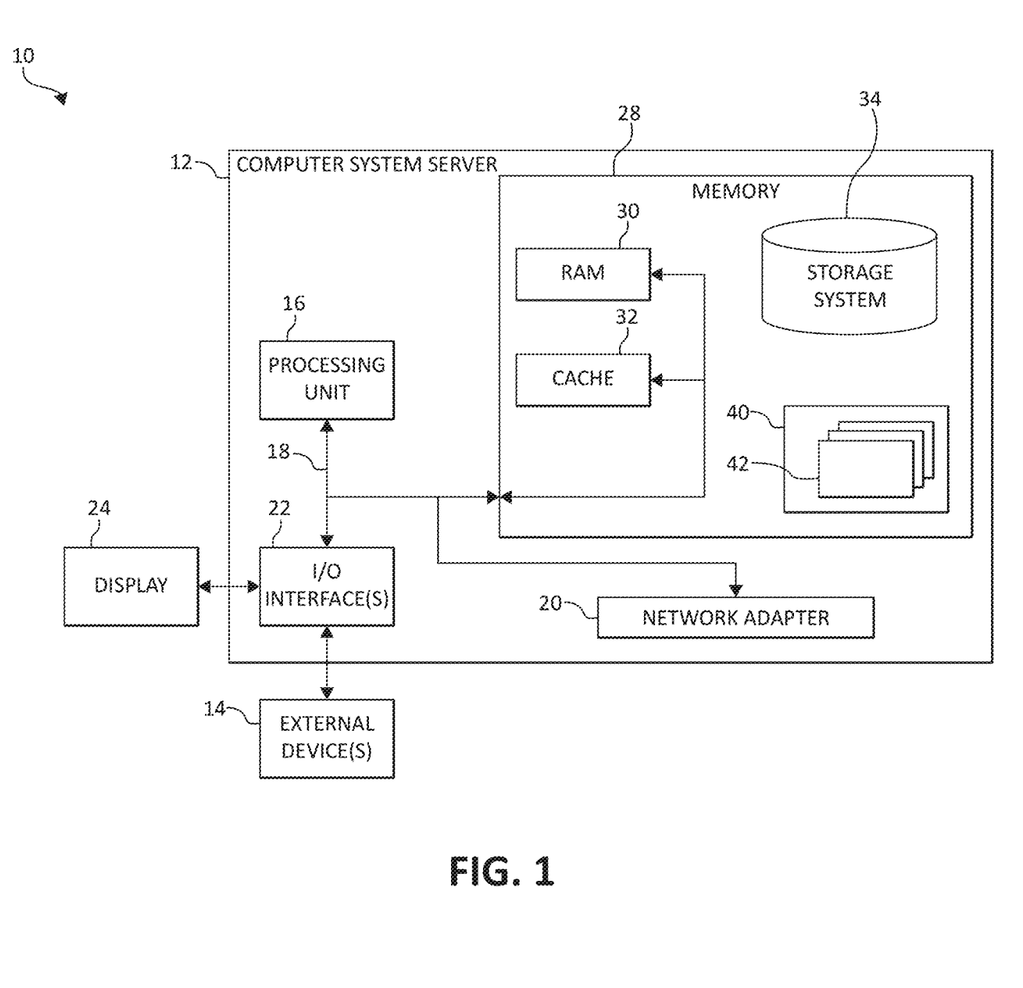
FIG. 1 is a block diagram depicting an exemplary computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 (and/or one or more processors described herein) is capable of being implemented and/or performing (or causing or enabling) any of the functionality set forth herein.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in, for example, personal computer systems, server computer systems, thin clients, thick clients, hand-held or laptop devices, multiprocessor systems, microprocessor-based systems, set top boxes, programmable consumer electronics, network PCs, mobile electronic devices such as mobile (or cellular and/or smart) phones, personal data assistants (PDAs), tablets, wearable technology devices, laptops, handheld game consoles, portable media players, etc., as well as computing systems in vehicles, such as automobiles, aircraft, watercrafts, etc. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
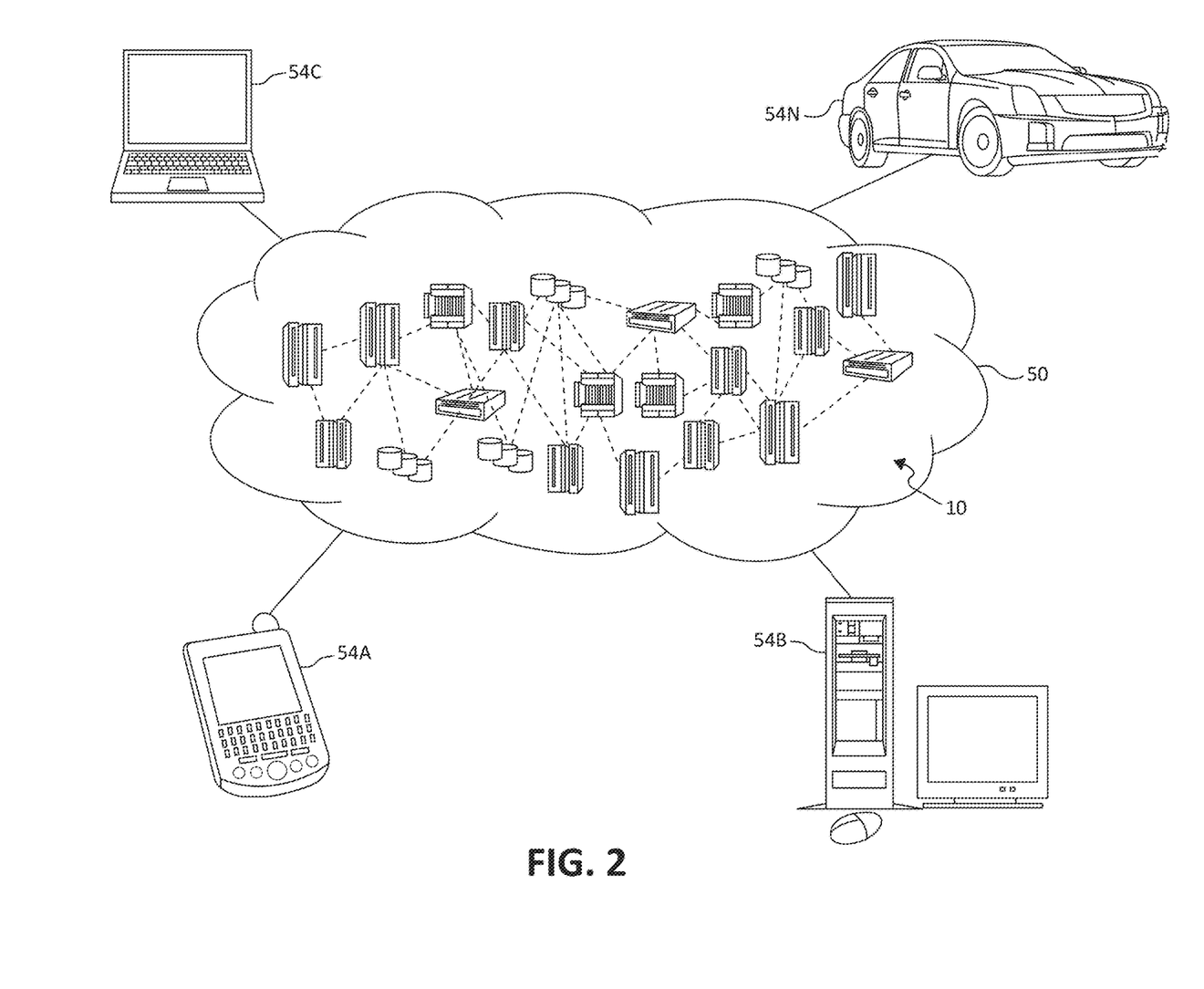
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, cellular telephone or PDA 54A, desktop computer 54B, and/or laptop computer 54C, and vehicles (e.g., automobiles, aircraft, watercraft, etc.) 54N may communicate.

Still referring to FIG. 2, nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
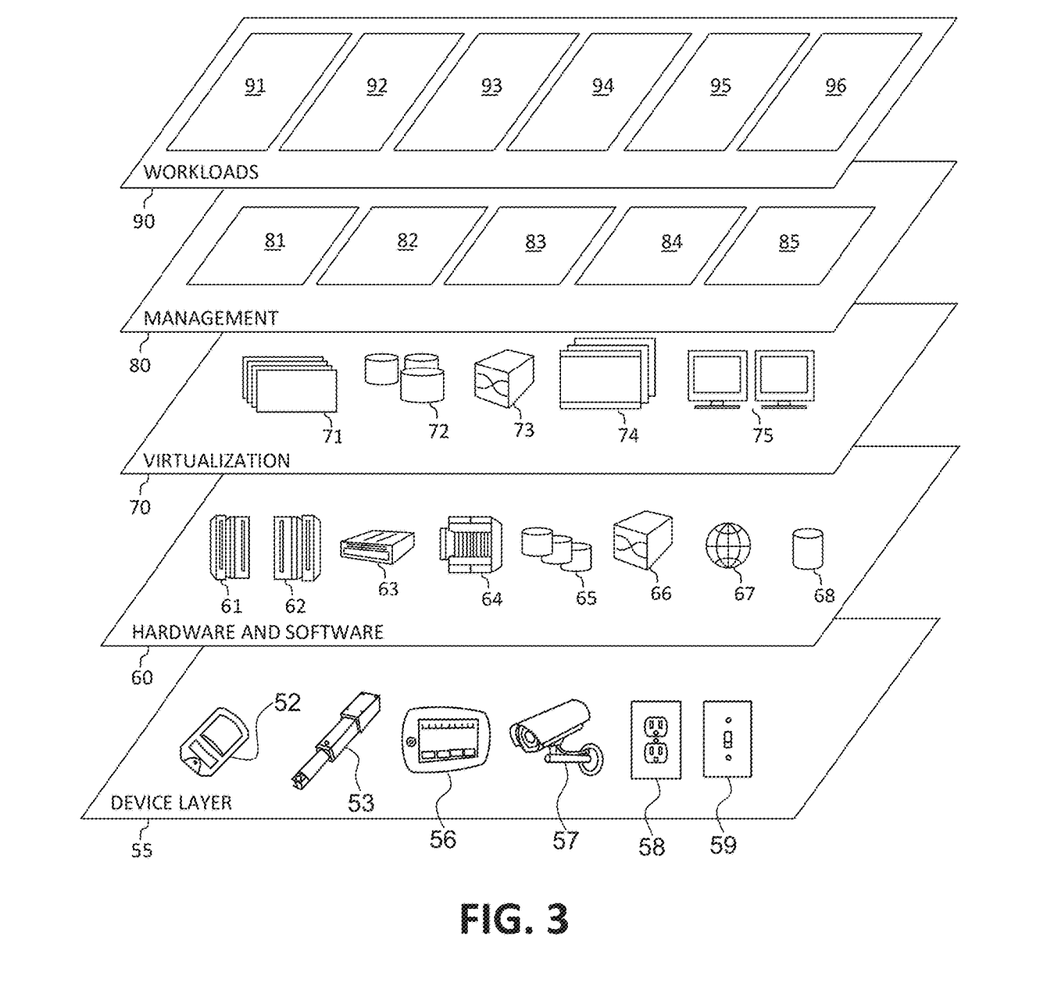
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to, various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for processing language as described herein. One of ordinary skill in the art will appreciate that the workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As mentioned above, in some embodiments, methods and systems for processing language are provided. Multiple document portions (e.g., multiple documents, multiple portions of documents, etc.), including text and/or alphanumeric characters, may be detected or received. A language type for each of the document portions may be determined, and a word list for each of the language types may be generated or selected. The word lists are used to convert the language (or text) of the document portions into a standardized (the same or common) language type. A language processing method may then be performed on the document portions to, for example, identify similarities, commonalities, etc. between the document portions. For example, the language processing method may be utilized to assist in searching for or determining potential patent infringement.

Figure 4:
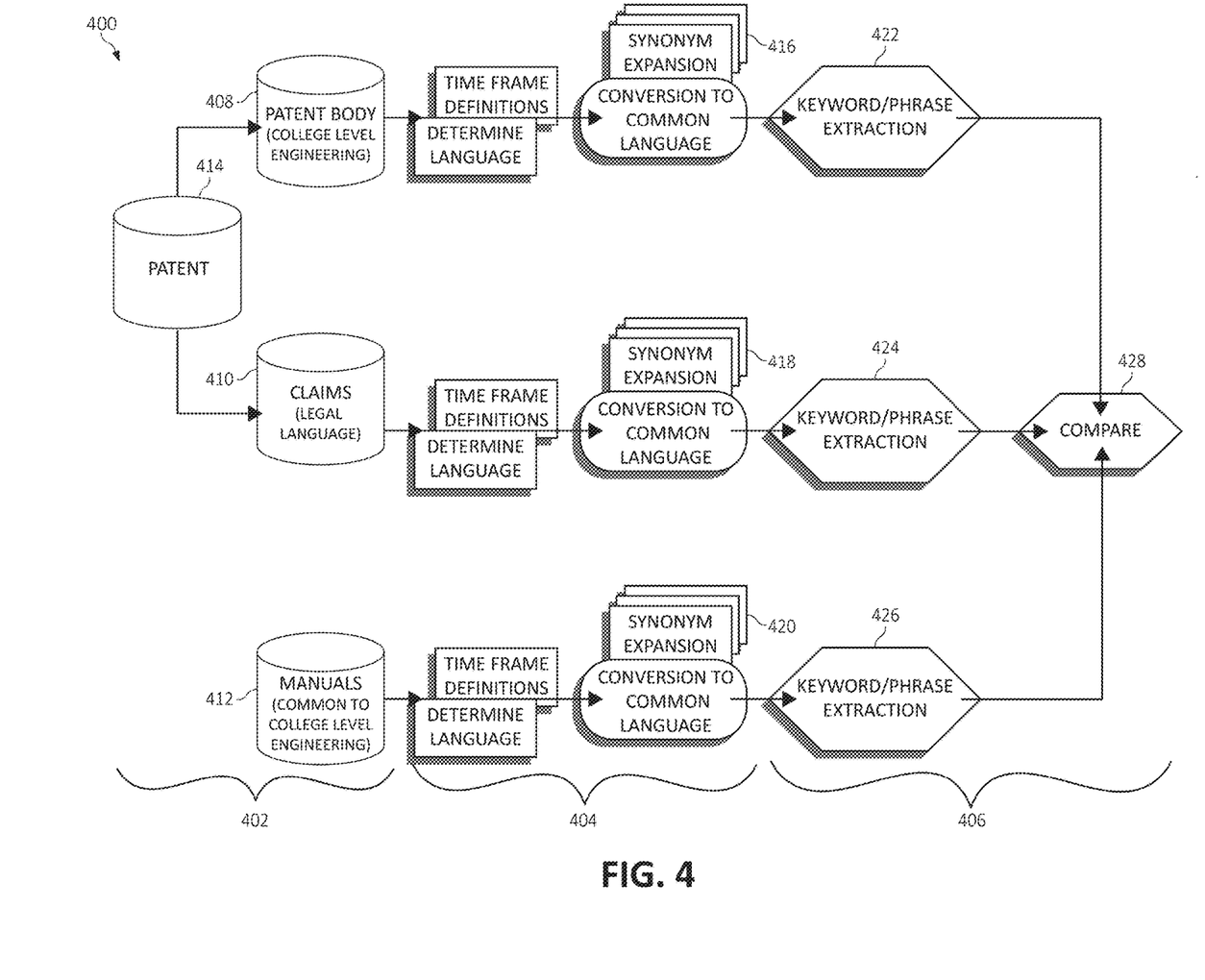
FIG. 4 is a block diagram/flowchart of a system for processing language according to an embodiment of the present invention.

FIG. 4 is a block diagram/flow chart of a system (and/or method) 400 for processing language according to some embodiments described herein. For illustrative purposes, the operation of the system 400 may be understood to be divided into three portions or phases, 402, 404, and 406 and may be performed with any suitable computing device or system, such as those described above.

During the first phase 402, document portions 408, 410, and 412 are received (or detected). Although three document portions 408, 410, and 412 are shown in FIG. 4, it should be understood that in some embodiments, a different number of documents or document portions (i.e., more or less) may be analyzed. In the depicted embodiment, document portion 408 is (or includes) the body (and/or detailed description) of a patent, and document portion 410 includes the claims of a patent. As such, it should be understood that document portions 408 and 410 may be extracted from (and/or located within) a patent 414.

In some embodiments, the detection of the different document portions may include identifying where the documentation uses different language types or constructs. Such a process may be utilized to parse a single document into multiple document portions (e.g., parsing patent 414 into patent body 408 and claims 410). It should be noted that although the use of the methods and systems described herein for patent analysis and/or infringement analysis may be referenced, it should be understood that such is only intended to provide an example of one possible type of use for the methods and systems described herein, as in other embodiments, the methods and systems may be applied to other types of analyses (e.g., language processing in general) and other types of documents (or document portions) may be analyzed. Still referring to FIG. 4, in the depicted embodiment, document 412 is one or more manuals (e.g., a user manual and/or repair manual), such as those associated with a product that potentially infringes the claims of the patent 414.

During the second phase 404, each of the document portions 408, 410, and 412 undergoes a process to, for example, determine the language type used (or included) therein, generate (or select) a word list (or dictionary, word list, etc.) suitable to convert the respective document portion into a standardized language type, and perform the conversion thereof into the standardized language type. In some embodiments, the determining of the language type used in each of the document portions 408, 410, and 412 may be based on various aspects of, or data associated with, the document portions 408, 410, 412, such as the timeframe (or age) of the document portions, words used, the title/description, the context (or type) of document (or document portion), which may be manually entered by a user, automatically scanned, and/or performed using a cognitive analysis.

After the language type for each of the document portions is determined, a word list (and/or dictionary and/or synonym table) may be generated (or selected) for each of the document portions (and/or the corresponding language type) 408, 410, and 412, in particular, word lists (or synonym expansions) 416, 418, and 420, respectively. The word lists 416, 418, and 420 may be based on and/or include different aspects (or "slices") suitable to convert the document portions 408, 410, and 412 into a common or standardized language type based on the various language types.

For example, document portion 408 (i.e., the patent description or body) may include (or be written in) a language type that may be referred to as "college level engineering," document portion 410 (i.e., the patent claims) may include a language type that may be referred to as "legal language," and document portion 412 (i.e., the manual(s)) may include a language type that varies from common, conversational (or social) language to college level engineering. The word lists 416, 418, and 420 may be suitably selected based on such varying "knowledge base" levels associated with the language types. Also, in some embodiments, the word list(s) may be based on definitions found within the respective document portion or another document portion (e.g., definitions of words used in claims may be found with the patent description). As described above, the word lists may also be generated in light of the age of the respective document portion. Additionally, the word lists may take into consideration the type (or context) of the document (e.g., patent, user manual, repair manual, etc.), as different types of documents may use different "grades" (or knowledge base level) of language. Further, the word list may be selected (or generated) based on a type of technology related to (e.g., described in) the document (e.g., semiconductor processing, software, automotive, aerospace, etc.).

Still referring to FIG. 4, within the second phase 404, the word lists 416, 418, and 420 are then used to convert the respective document portions 408, 410, and 412 such that the language types thereof are all of the same language type (e.g., a common or standardized language type). For example, the text of the document portions may be converted into a relatively simple, easy-to-read language type (e.g., "grade school English") or a more "advanced" language type (e.g., a college level, technical English).

It should be understood that at least some of the document portions may already be written in the selected standardized language type. For example, one of the document portions, such as a user manual (e.g., document portion 412), may already be written in a simple language type, while the other document portions, such as those from a patent and/or repair manual, may be written in a more advanced language type. In such an instance, the user manual may not undergo the conversion into the standardized language type (i.e., because that document portion is already in the standardized language type).

In the depicted embodiment, after the document portions 408, 410, and 412 have been converted into the standardized language type, in the third phase 406, a language processing method is then performed (or caused to be performed) on the document portions 408, 410, and 412. The language processing method may include a NLP method (e.g., using a synonym table for the standardized language) and/or be performed utilizing a cognitive analysis. In some embodiments, the language processing method includes analyzing the document portions 408, 410, and 420 for similarities, commonalities, etc. (e.g., in the case of patent infringement, links for possible infringement). In particular, again referring to FIG. 4 as an example, each of the document portions 408, 410, and 420 may undergo a respective keyword and/or key phrase extraction process 422, 424, and 426. The extracted keywords and/or key phrases may then be compared at block 428.

Figure 5:
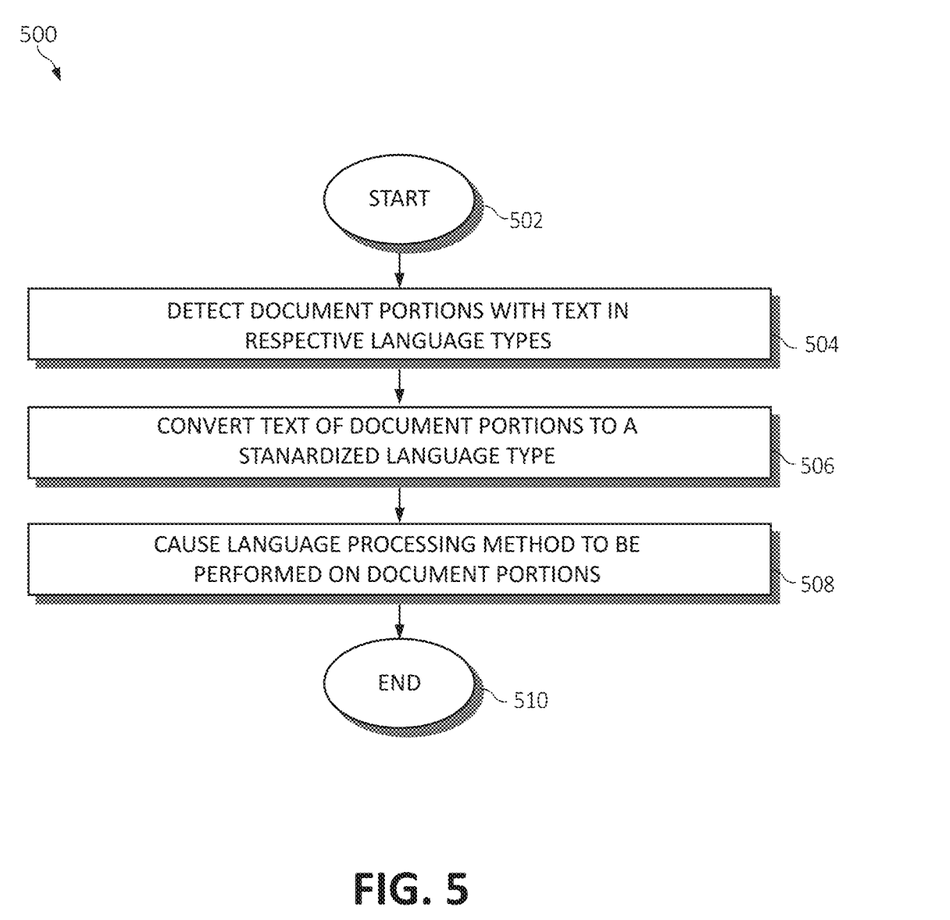
FIG. 5 is a flowchart diagram of an exemplary method for processing language according to an embodiment of the present invention.

Turning to FIG. 5, a flowchart diagram of an exemplary method 500 for processing language is illustrated. Method 500 begins (step 502) with, for example, a decision being made to analyze one or more document portions using a language processing method, such as NLP.

A plurality of document portions are detected (or received or retrieved) (step 504). Each of the plurality of document portions includes text in a respective language type (e.g., knowledge base level, skill level, etc. and/or natural language). The language type of the text in each of the plurality of document portions may be different than the language type of the text in the others of the plurality of document portions. The document portions may be complete documents or portions of documents that are written in and/or include text or alphanumeric characters. The document portions may be any type of document suitable for undergoing a language processing method, such as patents, patent applications, manuals, books, etc.

The text of each of the plurality of document portions is converted to a standardized language type (step 506). The standardized language type may be, for example, an easy-to-read, common language type (e.g., conversational English) or a more advanced language type (e.g., including legal language, college level engineering language, etc.). A word list may be selected for each of the plurality of document portions. The converting of the text of each of the plurality of document portions to the standardized language type may be based on the respective word list. The selecting of the word list for at least some of the plurality of document portions may be based on at least one of a context of the respective document portion, an age of the respective document portion, a natural language of the respective language type, and a knowledge base (or skill level) associated with the respective document portion. The selecting of the word list for at least some of the plurality of document portions may be based on definitions within the respective documents.

A language processing method is caused to be performed on the plurality of document portions after the converting of the text of each of the plurality of document portions to the standardized language type (step 508). The language processing method may be performed utilizing a synonym table. The language processing method may include natural language processing (NPL) and/or a cognitive analysis.

Method 500 ends (step 510) with, for example, the results of the language processing method being provided to a user. For example, if the language processing method includes extracting keywords and/or key phrases from the document portions, one or more lists may be generated that indicate the keywords and/or key phrases the document portions have in common.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method, by one or more processors, for processing language comprising:
 detecting a plurality of document portions, wherein each of the plurality of document portions includes text in a respective language type, the respective language type associated with a technical skill level requisite to understand the text;
selecting a word list for each of the plurality of document portions based, at least in part, on an age of the plurality of document portions;
converting the text of each of the plurality of document portions from a detected source language to a standardized language type, wherein the standardized language type is based on the detected source language of the respective language type such that the converting transforms the text into linguistic terms in which the technical skill level requisite to understand the text is standardized notwithstanding whether the detected source language of the respective language type and the standardized language type are of a same language, and wherein the converting is based on the word list such that the word list includes at least synonyms for those portions of the plurality of document portions having the linguistic terms of which meanings thereof have changed over time according to the age of the plurality of document portions; and
causing a language processing method to be performed on the plurality of document portions after the converting of the text of each of the plurality of document portions to the standardized language type.

2. The method of claim 1, wherein the language type of the text in each of the plurality of document portions is different than the language type of the text in the others of the plurality of document portions.

3. The method of claim 1, wherein the converting is further based on a context of the respective document portion.

4. The method of claim 1, wherein the selecting of the word list for at least some of the plurality of document portions is based on at least one of a natural language of the respective language type and a knowledge base associated with the respective document portion.

5. The method of claim 1, wherein the selecting of the word list for at least some of the plurality of document portions is based on definitions within the respective documents.

6. The method of claim 1, wherein the language processing method is at least one of performed utilizing a synonym table, includes natural language processing (NPL), and includes a cognitive analysis.

7. A system for processing language comprising:
at least one processor that
detects a plurality of document portions, wherein each of the plurality of document portions includes text in a respective language type, the respective language type associated with a technical skill level requisite to understand the text;
selects a word list for each of the plurality of document portions based, at least in part, on an age of the plurality of document portions;
converts the text of each of the plurality of document portions from a detected source language to a standardized language type, wherein the standardized language type is based on the detected source language of the respective language type such that the converting transforms the text into linguistic terms in which the technical skill level requisite to understand the text is standardized notwithstanding whether the detected source language of the respective language type and the standardized language type are of a same language, and wherein the converting is based on the word list such that the word list includes at least synonyms for those portions of the plurality of document portions having the linguistic terms of which meanings thereof have changed over time according to the age of the plurality of document portions; and
causes a language processing method to be performed on the plurality of document portions after the converting of the text of each of the plurality of document portions to the standardized language type.

8. The system of claim 7, wherein the language type of the text in each of the plurality of document portions is different than the language type of the text in the others of the plurality of document portions.

9. The system of claim 7, wherein the converting is further based on a context of the respective document portion.

10. The system of claim 7, wherein the selecting of the word list for at least some of the plurality of document portions is based on at least one of a natural language of the respective language type and a knowledge base associated with the respective document portion.

11. The system of claim 7, wherein the selecting of the word list for at least some of the plurality of document portions is based on definitions within the respective documents.

12. The system of claim 7, wherein the language processing method is at least one of performed utilizing a synonym table, includes natural language processing (NPL), and includes a cognitive analysis.

13. A computer program product for processing language by one or more processors, the computer program product comprising a non-transitory computer-readable storage medium having computer-readable program code portions stored therein, the computer-readable program code portions comprising:
an executable portion that detects a plurality of document portions, wherein each of the plurality of document portions includes text in a respective language type, the respective language type associated with a technical skill level requisite to understand the text;
an executable portion that selects a word list for each of the plurality of document portions based, at least in part, on an age of the plurality of document portions;
an executable portion that converts the text of each of the plurality of document portions from a detected source language to a standardized language type, wherein the standardized language type is based on the detected source language of the respective language type such that the converting transforms the text into linguistic terms in which the technical skill level requisite to understand the text is standardized notwithstanding whether the detected source language of the respective language type and the standardized language type are of a same language, and wherein the converting is based on the word list such that the word list includes at least synonyms for those portions of the plurality of document portions having the linguistic terms of which meanings thereof have changed over time according to the age of the plurality of document portions; and
an executable portion that causes a language processing method to be performed on the plurality of document portions after the converting of the text of each of the plurality of document portions to the standardized language type.

14. The computer program product of claim 13, wherein the language type of the text in each of the plurality of document portions is different than the language type of the text in the others of the plurality of document portions.

15. The computer program product of claim 13, wherein the converting is further based on a context of the respective document portion.

16. The computer program product of claim 13, wherein the selecting of the word list for at least some of the plurality of document portions is based on at least one of a natural language of the respective language type and a knowledge base associated with the respective document portion.

17. The computer program product of claim 13, wherein the selecting of the word list for at least some of the plurality of document portions is based on definitions within the respective documents.

18. The computer program product of claim 13, wherein the language processing method is at least one of performed utilizing a synonym table, includes natural language processing (NPL), and includes a cognitive analysis.

* * * * *

UNITED STATES PATENT AND TRADEMARK OFFICE
CERTIFICATE OF CORRECTION

| | | |
|---|---|---|
| PATENT NO. | : 11,200,378 B2 | Page 1 of 1 |
| APPLICATION NO. | : 16/157573 | |
| DATED | : December 14, 2021 | |
| INVENTOR(S) | : Thomas J. Fleischman et al. | |

It is certified that error appears in the above-identified patent and that said Letters Patent is hereby corrected as shown below:

On the Title Page

Item (72), Sue Hallen, should read Susan Hallen

Signed and Sealed this
First Day of November, 2022

Katherine Kelly Vidal
*Director of the United States Patent and Trademark Office*